Figure 9:
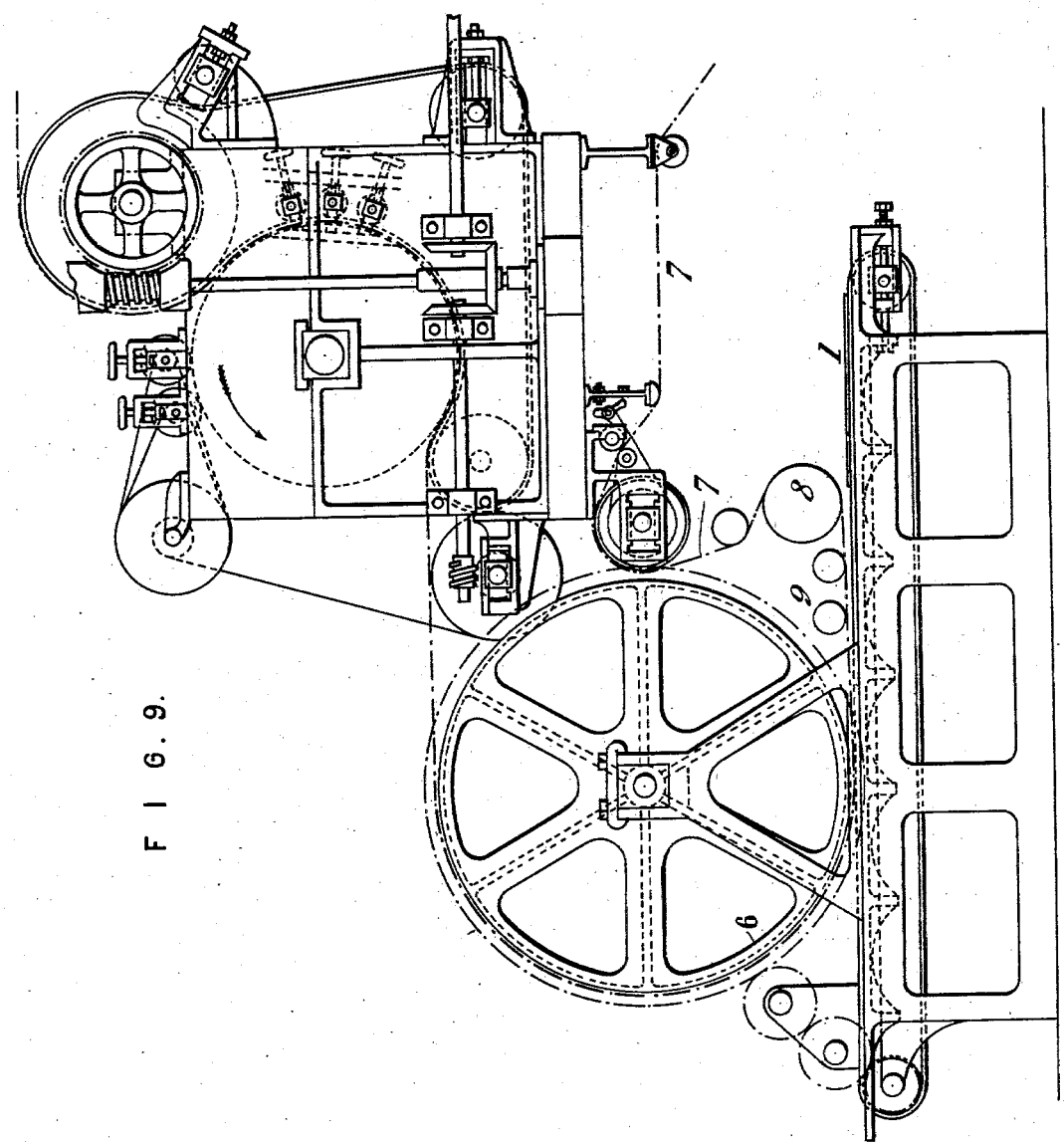

No. 629,281. Patented July 18, 1899.
F. WALTON.
APPARATUS FOR MANUFACTURING MOSAIC FLOOR CLOTH.
(Application filed Feb. 8, 1899.)
(No Model.) 8 Sheets—Sheet 1.
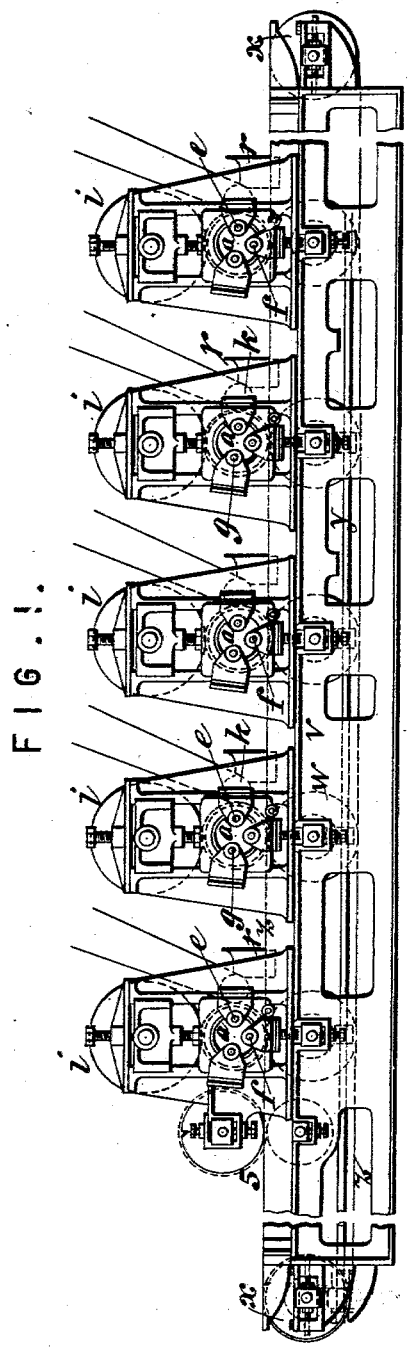

No. 629,281. Patented July 18, 1899.
F. WALTON.
APPARATUS FOR MANUFACTURING MOSAIC FLOOR CLOTH.
(Application filed Feb. 8, 1899.)
(No Model.) 8 Sheets—Sheet 2.
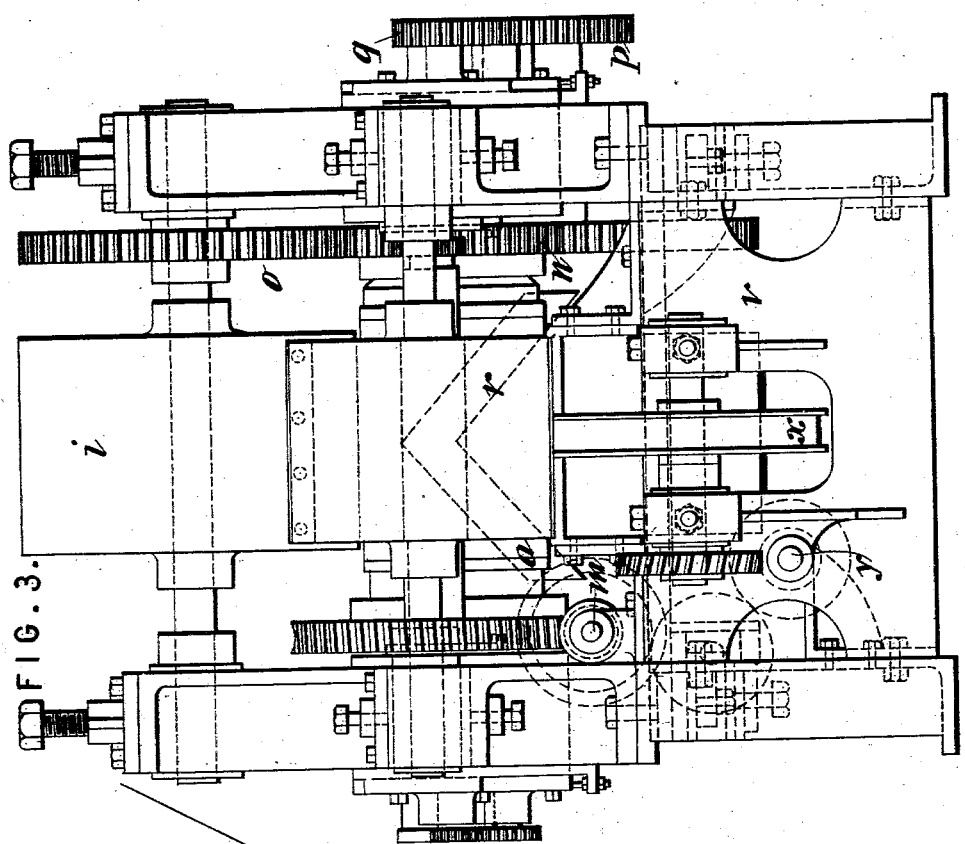
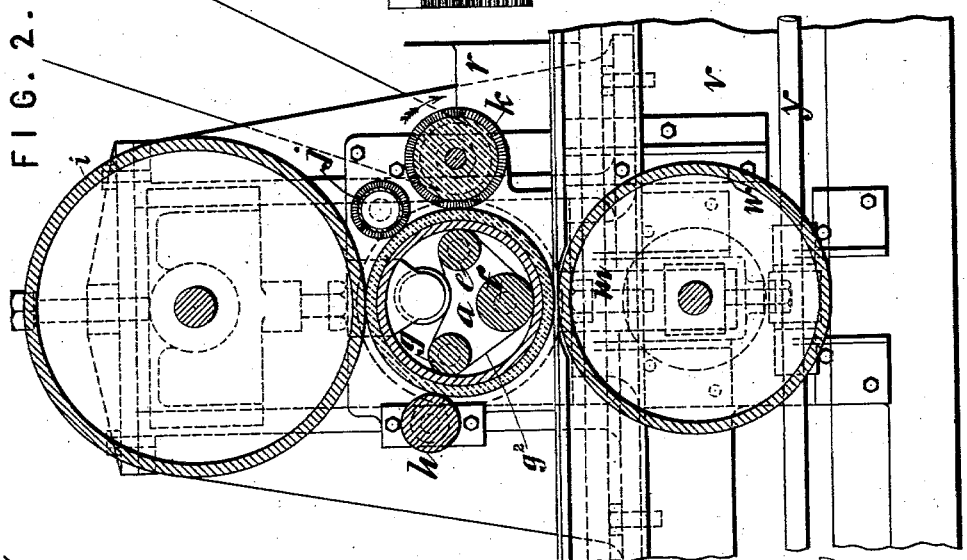

No. 629,281. Patented July 18, 1899.
F. WALTON.
APPARATUS FOR MANUFACTURING MOSAIC FLOOR CLOTH.
(Application filed Feb. 8, 1899.)
(No Model.) 8 Sheets—Sheet 3.
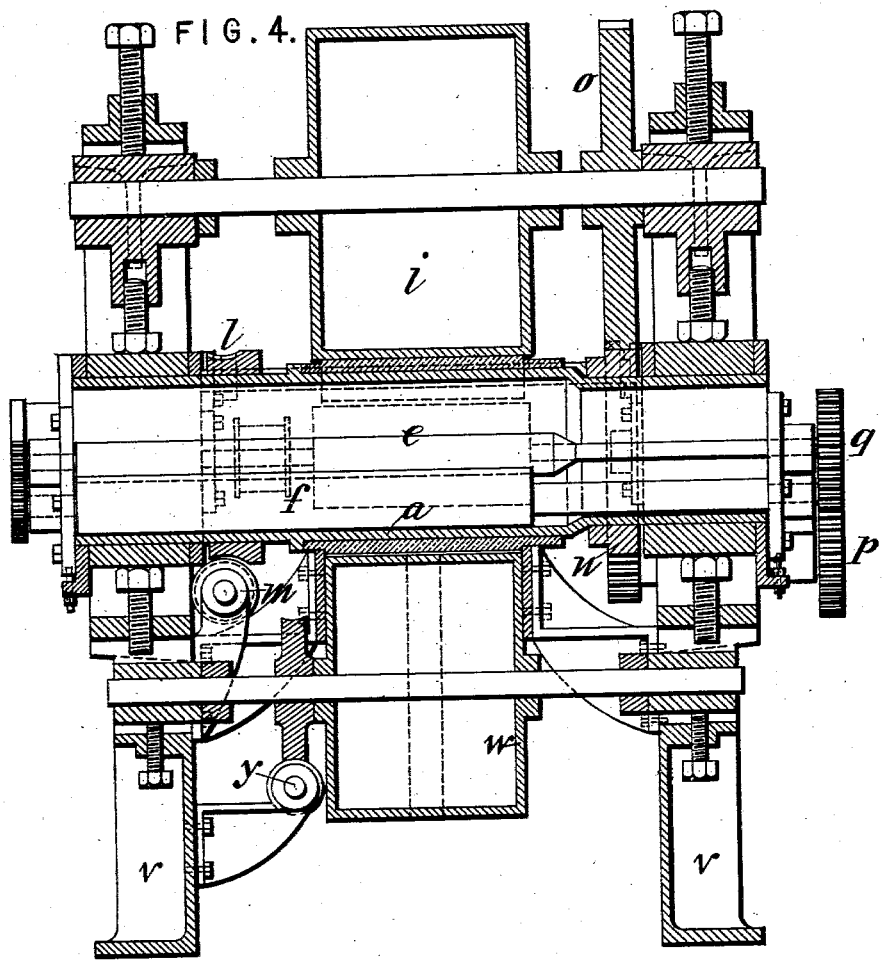

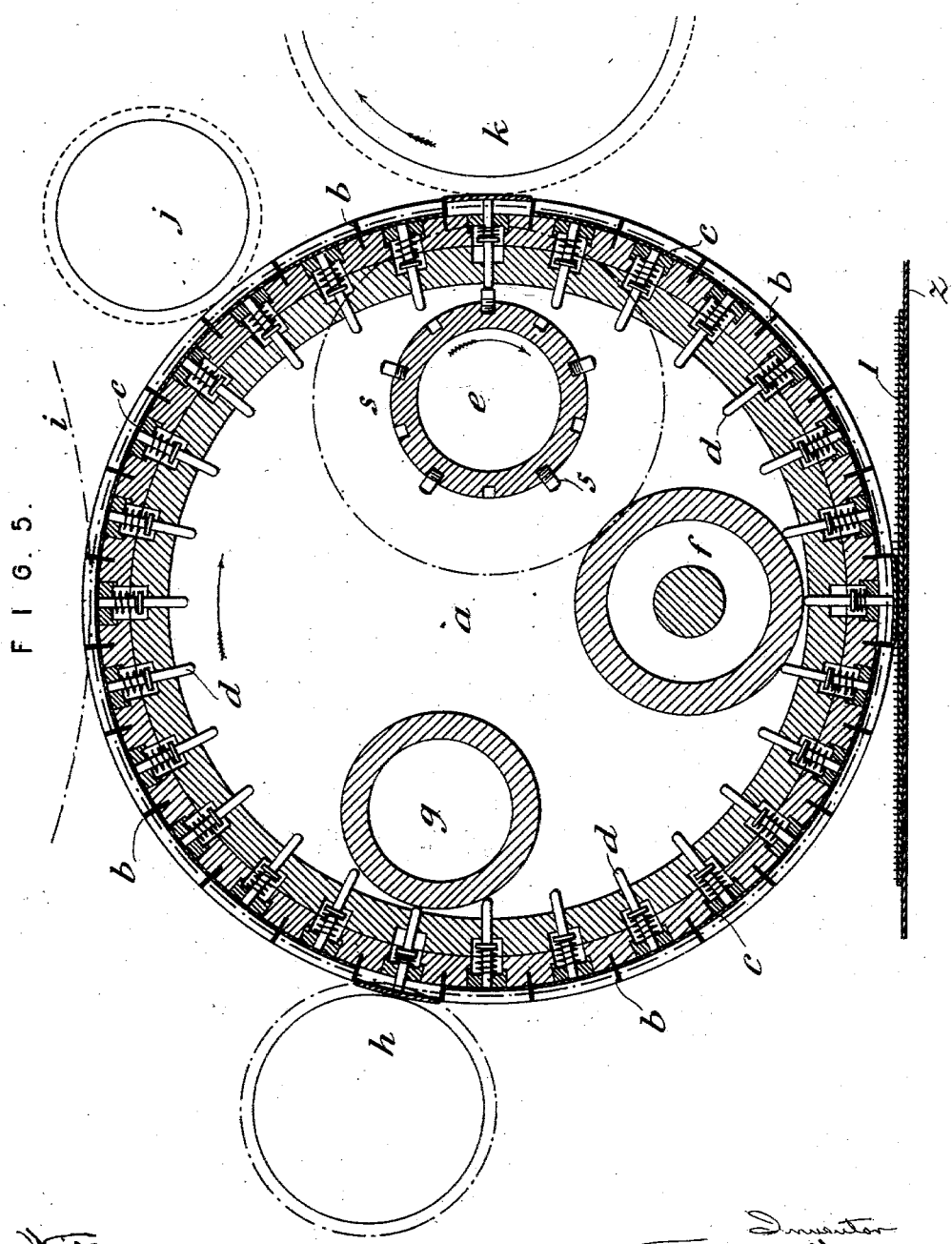

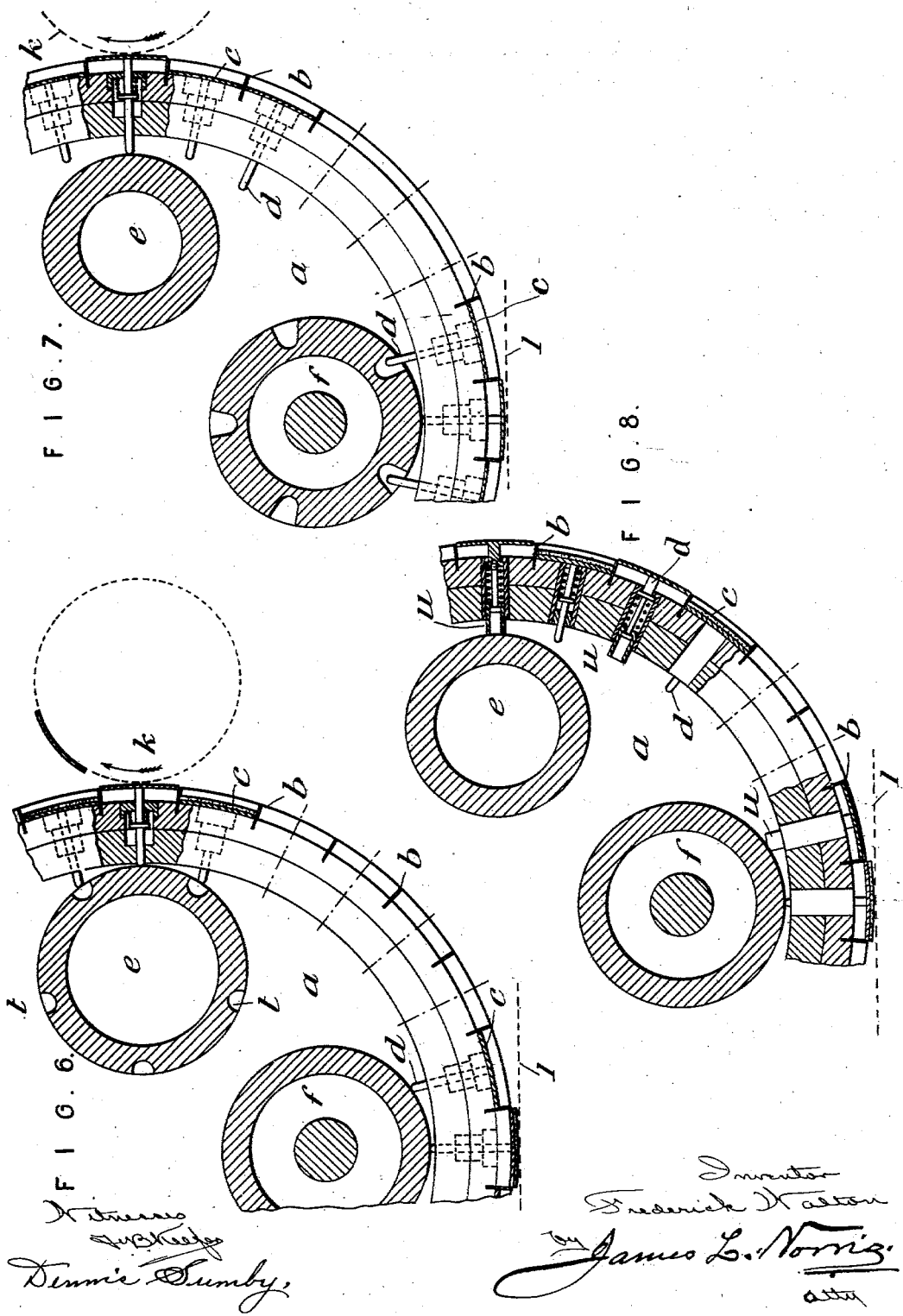

No. 629,281. Patented July 18, 1899.
F. WALTON.
APPARATUS FOR MANUFACTURING MOSAIC FLOOR CLOTH.
(Application filed Feb. 8, 1899.)
(No Model.) 8 Sheets—Sheet 6.

No. 629,281. Patented July 18, 1899.
F. WALTON.
APPARATUS FOR MANUFACTURING MOSAIC FLOOR CLOTH.
(Application filed Feb. 8, 1899.)
(No Model.) 8 Sheets—Sheet 8.
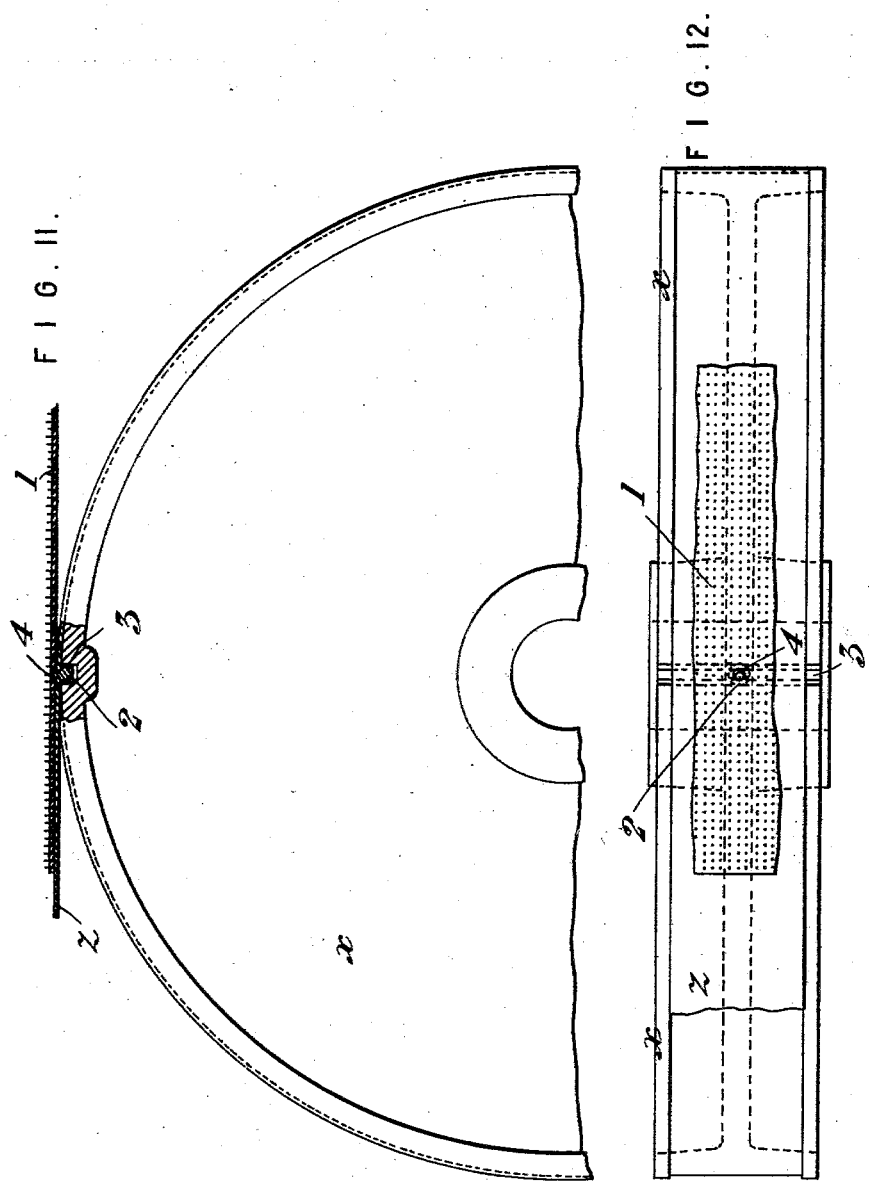

UNITED STATES PATENT OFFICE.

FREDERICK WALTON, OF LONDON, ENGLAND.

APPARATUS FOR MANUFACTURING MOSAIC FLOOR-CLOTH.

SPECIFICATION forming part of Letters Patent No. 629,281, dated July 18, 1899.

Application filed February 8, 1899. Serial No. 704,960. (No model.)

*To all whom it may concern:*

Be it known that I, FREDERICK WALTON, a citizen of England, residing at 114 Holborn, in the city of London, England, have invented certain new and useful Improvements in Apparatus for the Manufacture of Mosaic Floor-Cloth, of which the following is a specification.

Machines at present in use for the manufacture of mosaic floor-cloth are necessarily very large and costly, as they have to be made wide enough to produce a continuous web of about two yards in width.

My invention relates to apparatus so constructed and operating as to greatly reduce the size and cost of the machinery, as will now be described. Along horizontal guides a number of plates, which are preferably, for the sake of lightness, made of aluminium, are caused to travel in close contact with each other end to end, each plate having length equal to the width of the floor-cloth to be made—say two yards—and having breadth equal to one repeat of the pattern—say half a yard. Each plate has a number of pins projecting from its surface. Over these plates revolve with equal surface speed as many cylinders as there are colors in the pattern, each cylinder having projecting from its periphery knives arranged according to several repeats of the pattern and having over it a pressing-cylinder, so that a colored sheet of linoleum material as it passes between the pressing-cylinder and the cutting-cylinder is cut into tesseræ, which occupy the spaces between the knives on the periphery of the cylinders. Each cylinder is provided with means of extruding and removing such of the tesseræ as are not required for the pattern and for pressing those tesseræ that are required onto the pins of the plates below. These plates as they travel under the successive cutting-cylinders receive from each tesseræ of one color, each plate as it leaves the last of the cutting-cylinders having on it the differently-colored tesseræ, constituting as many repeats of the pattern as can be accommodated in its length. As the plates continue their travel a revolving knife severs the web of tesseræ at the junctions of the successive plates, leaving the foremost plate, with its charge of tesseræ, free to be removed. These plates are then successively placed with their sides, not their ends, in contact on a pair of traveling bands, by which they are led under a heated sheet of backing fabric coated with cementing material and a drum which may be furnished with projecting pins, the backing fabric and the surface of the drum traveling at the same rate as the plate. The tesseræ being held on the backing by the cement are removed from the plates, which are then taken to receive fresh charges of tesseræ, while the backing, with the tesseræ on it, is carried by the drum to a set of heated and pressing rollers of known kind, by which the tesseræ are caused to cohere and to adhere to the backing.

The cutting-cylinders above referred to are constructed and arranged generally as those hitherto in use; but they are very much shorter and are provided with certain additional and modified details for more effectually separating the tesseræ where they are cut and for more simply and economically effecting extrusion of the unnecessary tesseræ. Also the cylinder and parts connected therewith for removing the tesseræ from the plates and attaching them to the backing generally resemble the apparatus for the same purpose hitherto in use, with certain modifications for rendering these appliances more effective.

The machinery above described in general terms will now be described in detail with reference to the accompanying drawings.

Figure 10:
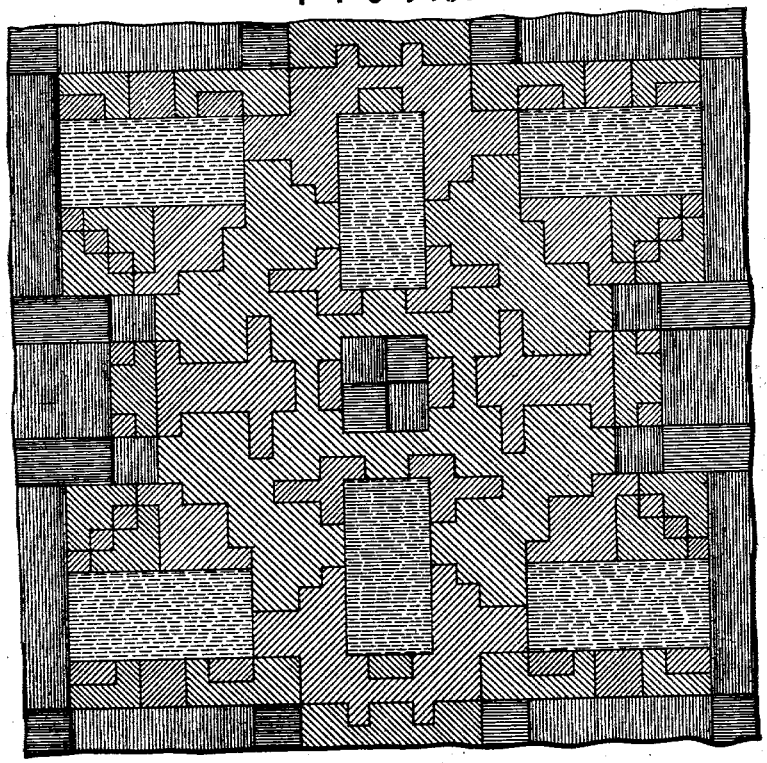

Figure 1 is a side view of the apparatus for cutting tesseræ of five different colors and placing them on the transfer-plates. Figs. 2, 3, and 4 are drawn to an enlarged scale, Fig. 2 being a transverse section, and Fig. 4 a longitudinal section, of one of the cutting-cylinders and its adjuncts, and Fig. 3 being an end view of the same. Fig. 5 is an entire transverse section; and Figs. 6, 7, and 8 are part transverse sections of four of the cutting-cylinders shown in Fig. 1 adapted for different sizes of the tesseræ. Fig. 9 is a side elevation of the machine for fixing the tesseræ on the backing. Fig. 10 is an example of one repeat of a pattern of five colors distinguished by different directions of hatching-lines. Fig. 11 is a section, and Fig. 12 a plan, of part of one of the transfer-plates and of the drum over which it passes under each cutting-cylinder.

Each cutting-cylinder *a* has cutting-blades $b$, projecting from its surface to a height corresponding nearly with the thickness of the sheet of material which it has to cut. The spaces between the blades have bottom plates $c$, each of which is provided with a stem $d$; but these stems are in some of the cylinders $a$ different from those in others of the cylinders in order to suit the forms of the tesseræ which each of the cylinders has to deliver as parts of the pattern or has to discharge as forming no parts of the pattern.

Within each of the cylinders $a$, which is hollow, are mounted three rollers—one, $e$, for extruding all the tesseræ not required for the pattern, one, $f$, for pressing on the transfer-plates all the tesseræ required for the pattern, and one, $g$, for pushing out all the bottom plates $c$ to have their surfaces greased by an external roller $h$, which is covered with felt served with oily material to prevent the tesseræ from adhering to the plates. Outside the cylinder $a$ there is a pressing-cylinder $i$ and a stiffly-bristled revolving brush $j$ for pressing the cut tesseræ into the spaces between the cutting-blades, and a rapidly-revolving stiff brush for throwing off the tesseræ that are not required. On one end of the cylinder $a$ is fixed a worm-wheel $l$, gearing with a worm $m$, that extends along the whole row of cutting-cylinders $a$, driving them all at the same speed. On the other end of $a$ is a toothed wheel $n$, which gears with a wheel $o$ on the shaft of the pressing-roller $i$, driving it at the same surface speed as $a$. The wheel $n$ also gears with a pinion on a short shaft on which is fixed a pinion $p$, gearing with a pinion $q$, fixed on the shaft of the internal roller $e$, which is thus caused to revolve as many times during one revolution of $a$ as there are repeats of pattern on $a$. The other internal rollers $f$ and $g$ do not require to be driven, but it is preferred to drive them by a chain $g^2$ from $e$, as shown in Fig. 2. The external greasing-roller $h$ and brush $j$ have on their shafts pinions gearing with the wheel $n$, and the revolving brush $k$ is driven rapidly by a band from any convenient motor.

As has been stated above, the stems $d$ of the bottom plates $c$ are varied to suit different forms of the tesseræ, which are cut out of the sheet of material as it passes between the cylinder $a$ and the pressing-roller $i$, the tesseræ so cut being pressed into the space between the cutting-blades $b$ by the revolving stiff-bristled brush $j$. When the tesseræ are brought around between the internal roller $e$ and the external revolving brush $k$, those that are not required for the pattern are extruded and cleared away by the bristles of $k$, which throw them over onto inclined guides $r$, down which they slide to either side of the machine. The extrusion of the unnecessary tesseræ is effected by the roller $e$, acting on the spring-stems $d$ of the bottom plates $c$. For certain sets of patterns it is desirable to employ stems $d$ all of equal length, as shown in Figs. 5 and 6, and to make the roller $e$ either with projecting pegs $s$, as shown in Fig. 5, arranged to meet some of the stems $d$ and push them outward to extrude some of the tesseræ, or with recesses $t$, as shown in Fig. 6, so that all the stems $d$ are pushed out, extruding tesseræ, except those which enter the recesses in $e$. The two arrangements shown in Figs. 5 and 6 are best adapted for use when there is a large quantity to be manufactured to one pattern to which the roller $e$ can be suited without any change of the stems $d$, and in order to adapt the arrangement shown in Fig. 5 for manufacture of several different patterns the roller $e$ is preferably made with a large number of holes all over its surface, so that the pegs $s$ can be screwed into different holes to suit the different patterns. As shown in Fig. 7, the roller $e$ is a plain roller acting only on those of the stems $d$ which are longer than the others for the extrusion of tesseræ. This, however, requires the roller $f$ to be driven and to be made with recesses to receive the ends of the longer stems, which would otherwise be forced too far out by $f$. In this case a roller such as $g$ has to be made of elastic material to yield to the longest stems of the plates. For very small tesseræ the arrangement shown in Fig. 8 is preferred, both the rollers $e$ and $f$ being plain rollers and the stems $d$ of the plates of such of the tesseræ as have to be rejected having added by them sliding sleeves $u$, with springs interposed between them and the plates $c$. In this case none of the internal rollers $e$ $f$ $g$ require to be driven, the rejection of tesseræ depending on the selection of stems $d$ with spring-sleeves $u$. Of the five sets of tesseræ-cutting apparatus shown in Fig. 1 some have their stems $d$ and rollers $e$ and $f$ arranged in one of the four ways described and some in another of these ways, according to the exigencies of the pattern. In all cases the tesseræ which are not ejected by the action of the rollers $e$ are pushed by the action of the roller $f$ onto pegged transfer-plates such as will be presently described in their proper positions, according to the pattern. Also in all cases the plates $c$ are pushed out by the rollers $g$ a little beyond the cutting-blades of the cylinder $a$ to be greased by the roller $h$ for the purpose of preventing adhesion to them of the tesseræ next pressed on them by the pressing-roller $i$.

The five sets of tesseræ-cutting apparatus are mounted on a suitable base $v$, having bearings for the shafts of rollers $w$, one under each of the cutting-cylinders $a$, and of pulleys $x$, one at each end of the base $v$. The rollers $w$ and the pulleys $x$ have on their shafts worm-wheels all driven at the same speed by worms on a longitudinal shaft $y$. Around the pulleys $x$ passes a steel band $z$, which at intervals apart equal to the length of each of the transfer-plates 1 has a taper stud 2, projecting from its under side, with a stem projecting upward. Each of the pulleys $x$ and of the rollers $w$ has across one part of its periphery a groove 3, which receives the studs 2 of the band. These plates 1 (partly shown in Figs. 11 and 12) are preferably made of aluminium for the sake of lightness and are provided all over their surface with sharp slightly-projecting pins, each plate having a hole 4. As the steel band $z$ is caused by the pulleys $x$ to travel from right to left transfer-plates 1 are successively placed lengthwise on the band at the right-hand end of the machine shown in Fig. 1, the hole 4 of each plate being placed on one of the stems of the studs 2 of the band. As plate after plate is put on the band with their ends in contact they are carried onward between the several cutting-cylinders $a$ and the corresponding rollers $w$ below them, the plate receiving from the cutting-cylinders tesserae of different colors pressed upon the pins which hold them in position, until after passing the last of the cutting-cylinders $a$ the transfer-plate presents itself at the left end of the machine quite covered with tesserae, forming a complete pattern. Just beyond the last cutting-cylinder $a$ on the left is mounted a pair of cutting-rollers 5, the upper carrying a blade which cuts the material on the two adjacent plates exactly on the line where these sides meet, leaving the most advanced plate free to be removed, with the tesserae on it, to the finishing-machine shown in Fig. 9, which is a machine now known and used somewhat modified, and will now be described. Hitherto the main drum 6 of this machine has been provided with projecting pins in order to raise the tesserae out of the transfer-plates 1 as they passed beneath the drum and carry them around with the backing fabric 7 to the final pressing apparatus above. This providing of the drum 6 is now rendered unnecessary by mounting a heated roller 8 and a pair of pressing-rollers 9 at the receiving end of the machine. The backing fabric 7, which has been previously served on its under surface with suitable cement, in passing under the hot roller 8 has its cement so softened that the tesserae on the transfer-plate 1 in passing under the rollers 8 and 9 are caused to adhere to the backing and are raised by it off the pins of the transfer-plates and around the drum 6 up to the final pressing apparatus, which causes the tesserae to cohere together and to adhere permanently to the backing. It is to be understood that the transfer-plates 1 are placed on the band of the machine shown in Fig. 9 sidewise, the side of each plate in contact with the side of the next.

From the above description it will be seen that by moving the transfer-plates in the direction of their length, which is four times their breadth, the cutting-cylinders and their adjuncts, which are the most complex and expensive parts of the machinery, require to have a width only about one-fourth of that which they have in existing machines of the like kind; also, that the sheets of material from which the tesserae are cut need have only one-fourth of the width which they now have, and that the roller apparatus for producing these sheets is correspondingly reduced. Thus by depositing the tesserae on long narrow transfer-plates moving lengthwise and then removing the tesserae from the same plates moving sidewise, while floor-cloth of full width is produced, the size and cost of the principal parts of the machinery are very much reduced.

Having thus described the nature of this invention and the best means I know of carrying the same into practical effect, I claim—

1. In apparatus for the manufacture of mosaic floor-cloth, in combination with a range of tesserae-cutting cylinders and their internal and external rollers, a roller under each of the cutting-cylinders, a pair of pulleys and a traveling band adapted to lead transfer-plates under the successive cutting-cylinders, and a pair of cutting-rollers adapted to sever the tesserae at the meeting-line of the plates substantially as described.

2. In apparatus for the manufacture of mosaic floor-cloth, in combination with the drum for removing the tesserae from the transfer-plates and the band for causing the plates to travel under the drum, a heated roller and a pair of pressing-rollers adapted to cause the tesserae to adhere to the backing substantially as described.

3. In apparatus for the manufacture of mosaic floor-cloth, the combination with the cutting-cylinder, and plain internal rollers, of the bottom plates having stems, the sliding sleeves on the stems, and the springs interposed between said bottom plate and said sliding sleeves, substantially as described.

In testimony whereof I have hereunto set my hand in presence of two subscribing witnesses.

FREDERICK WALTON.

Witnesses:
 FRED C. DAVIS,
 GERALD L. SMITH.